United States Patent [19]

Oechsle, III

[11] 4,267,299

[45] May 12, 1981

[54] METHOD OF CURING ISOCYANATE-TERMINATED POLYURETHANE PREPOLYMERS FOR USE IN SOLVENTLESS SPRAY APPLICATIONS

[75] Inventor: Sixtus J. Oechsle, III, Philadelphia, Pa.

[73] Assignee: Metalweld, Inc., Philadelphia, Pa.

[21] Appl. No.: 53,200

[22] Filed: Jun. 29, 1979

Related U.S. Application Data

[63] Continuation-in-part of Ser. No. 944,859, Sep. 22, 1978, abandoned.

[51] Int. Cl.$^3$ ............................................. C08G 18/08
[52] U.S. Cl. ....................................... 528/48; 528/59; 528/60; 528/64; 528/65; 528/66; 528/75
[58] Field of Search ....................... 528/60, 59, 48, 65, 528/66, 75, 64

[56] References Cited

U.S. PATENT DOCUMENTS

| | | | |
|---|---|---|---|
| 2,929,800 | 3/1960 | Hill | 260/32.6 N R |
| 3,427,366 | 2/1969 | Verdol et al. | 528/75 |
| 3,471,445 | 10/1969 | Carr | 528/65 |
| 3,718,624 | 2/1973 | Rustad | 528/60 |
| 3,725,355 | 4/1973 | Parrish et al. | 528/60 |
| 3,892,713 | 7/1975 | Burkus et al. | 528/65 |
| 3,897,401 | 7/1975 | Ringler et al. | 528/65 |

OTHER PUBLICATIONS

Hackh's Chemical Dictionary, McGraw-Hill, NY, 1944, p. 522.

*Primary Examiner*—Maurice J. Welsh
*Attorney, Agent, or Firm*—Robert S. Bramson

[57] ABSTRACT

Solventless compositions for preparing sprayable polyurethanes and poly(urea)urethanes by spraying a mixture of:
(a) An isocyanate-terminated prepolymer or quasi-prepolymer; and
(b) A curing agent comprising a relatively highly reactive polyol or polyamine or combination thereof and at least about 20% by weight of a reactive "filler" comprising a polyol having an equivalent weight in the range from about 300 to about 2,000.

20 Claims, No Drawings

METHOD OF CURING ISOCYANATE-TERMINATED POLYURETHANE PREPOLYMERS FOR USE IN SOLVENTLESS SPRAY APPLICATIONS

REFERENCE TO RELATED CASE

This is a continuation-in-part of U.S. Pat. application Ser. No. 944,859, filed Sept. 22, 1978, now abandoned.

BACKGROUND OF THE INVENTION

1. Field of the Invention

The invention relates to solventless, sprayable compositions for producing polyurethane and poly(urea)urethane coatings from an isocyanate-terminated prepolymer or quasiprepolymer, the products of such compositions and a process for producing such products.

2. State of the Art

In the past, polyurethane and poly(urea)urethane coatings formed from an isocyanate-terminated prepolymer have been applied by spraying, utilizing a volatile solvent-containing sprayable part A and a volatile solvet-containing, sprayable part B curing agent. The curing agent usually included a substantial quantity (on the order of 50% to 70% by weight of the ultimate coating) of a volatile organic solvent, such as ethyl acetate. These solvent-containing coatings were not commercially satisfactory for many purposes, because the evaporation of the solvent during the formation of the coating results in the production of holes in the coating and a stretching of the polyurethane material as a result of the empty space previously occupied by the evaporated solvent. The stretching weakens the coating, because of stress concentrations resulting from stretch of the coating material, increasing the likelihood of rupture of the coating or wear through abrasion of the coating, particularly at the areas of stress concentration. Solvent-containing coating systems cause other problems, such as solvent entrapment, causing inner coat delamination.

As used herein, a "solventless" system is one in which all or substantially all of the constituents of the part B remain as a part of the final polyurethane or poly(urea)urethane coating.

All of the systems of this invention are two component systems, in which "part A" primarily contains a polyurethane prepolymer or quasi-prepolymer and "part B" is the curing agent which contains the curing compounds which react with the part A to form a polyurethane or poly(urea)urethane coating.

Polyurethane and poly(urea)urethane coatings may also be formed using a so-called "one-shot" system. One-shot systems do not use a prepolymer or a quasi-prepolymer, but rather involve a reaction of an isocyanate with a suitable blend of polyols and polyamines to form the polyurethane or poly(urea)urethane coating. One-shot systems produce an extremely rapid reaction in the formation of the polyurethane or poly(urea)urethane, and do not lend themselves readily to application by spraying, since a relatively uniform coating of the polyurethane or poly(urea)urethane is extremely difficult to achieve. Coatings formed by one-shot systems also are subject to coating degradation by hydrolysis. Accordingly, one-shot systems are not conventionally used for spray application, but rather are used for injection molding, such as for automobile bumpers. When spraying one-shot systems, it is extremely difficult to control physical properties of the ultimate coating so that they are uniform. One-shot systems have been sprayed, but are not commonly used for spraying because of the difficulties attendant upon their use.

It is particularly desirable to be able to spray apply solventless polyurethane and poly(urea)urethane coatings, because it avoids the expense of making a mold which is attendant upon casting processes and avoids the expensive equipment and physical limitations attendant upon the use of centrifugal casting. Furthermore, when dealing with extremely large objects to be coated, such as fly-ash scrubbers, gasoline storage tanks, hopper bins, and the like, it is desirable to be able to field apply the polyurethane coating, in order to avoid the expense of transporting large and cumbersome objects to a factory for coating application. Also, the very size of some of these objects makes application of coatings by prior art processes expensive and difficult, and sometimes impossible.

It is also desirable to create spray-applied systems for producing polyurethane and poly(urea)urethane coatings with superior chemical and physical properties than prior art coatings.

It is therefore highly desirable to obtain a system for spray application of polyurethane and poly(urea)urethane coatings, comprising a part A prepolymer and a part B curing agent, which does not include a volatile solvent, so that the ultimate coating includes all of the constituents of the prepolymer and the curing agent. It is particularly desirable that all of the major constituents of the curing agent participate chemically, at least to some extent, in the reaction forming the polyurethane or poly(urea)urethane, so that a completely chemically bonded coating is formed, which is less susceptible to chemical degradation than is the case if the curing agent includes significant amounts of non-reactive constituents.

BRIEF SUMMARY OF THE INVENTION

The invention is directed to a composition for use in forming polyurethane and poly(urea)urethane coatings by solventless spray application. The part A of the system, which is the component of the system which provides the reactive isocyanate groups, is a urethane prepolymer or a quasi-prepolymer or a combination of the two. The part B curing agent comprises up to from about 10% to about 80% by weight of one or more relatively highly reactive "curing compounds" which function as chain extenders, cross-linking agents or both. The highly reactive curing compounds will react with most, but not all, of the available NCO groups in the part A and form the polyurethane or poly(urea)urethane polymer.

If a urethane polymer is desired, the curing compound will consist of one or more relatively highly reactive polyols, preferably diols. If a poly(urea)urethane or combination of polyurethane and poly(urea)urethane is desired, the part B curing agent will include one or more polyamines, preferably diamines, for a poly(urea)urethane or a mixture of polyamines and polyols for a combination product. The diamines are preferred in order to provide two reactive sites on the amine-contributing curing compound. As used herein, a "relatively highly reactive" or "highly reactive" compound is one which will substantially completely react with the NCO-groups in a prepolymer or quasi-prepolymer within a period from about two minutes to about five minutes, after mixing part A and part B.

The second essential constituent of the curing agent, comprising from about 20% to about 90% by weight of the part B, is a reactive (but not highly reactive) "filler", which also called a "reactive polyol filler" is a polyol or combination of polyols, having a relatively high equivalent weight. That is to say, the second constituent has a relatively low reactivity in relation to its molecular weight, and the equivalent weight of the filler constituent or constituents of the curing agent is in the range from about 300 to 2,000, and preferably in the range from about 300 to 1,000. As used herein, a "reactive filler" is one which will react with the NCO groups in a prepolymer or quasi-prepolymer, which reaction takes substantially in excess of about five minutes to be substantially completed.

The relatively highly reactive curing agent will substantially completely react with the NCO groups of the prepolymer or quasi-prepolymer within a period of two to five minutes and the reactive filler will also react initially with the NCO groups of the prepolymer or quasi-prepolymer, but this reaction will take on the order of one-half hour or more before it is substantially completed. Thus, for example, five minutes after the part A and part B of this invention have been mixed and sprayed, most of the available NCO groups will have reacted with the curing compound, but some will have reacted with the filler. After, for example, one hour has passed, substantially all of the NCO groups will have reacted with the curing compound and with most of the reactive filler. This allows the majority of the polyurethane of poly(urea)urethane reaction to be completed within a period of from two to five minutes, so that the reaction is substantially complete within that period, thereby eliminating the dripping and resulting non-uniform coating attendant upon the use of curing agents having substantially longer reaction times. However, after a period of, for example, two minutes has elapsed, there still will be reactive isocyanate sites left on the polymer being formed which will react, in part, with the filler, and will take up to one-half hour or an hour or more for the urethane-forming reaction to be completed. In this way, a small number of reactive sites of the polymer are chemically reacted with the filler, so that there is a chemical bond between the filler and prepolymer or quasi-prepolymer, as well as between the curing agent and prepolymer or quasi-prepolymer. This provides for a superior coating and avoids the innercoat delamination problem attendant upon the use of a non-reactive material as a filler, which is the case with prior art compositions and processes.

If an ether based prepolymer or quasi-prepolymer is used, it is most desirable to use one or more ether polyols as the curing compounds to produce polyurethanes. On the other hand, if an ester type of prepolymer or quasi-prepolymer is used, it is most desirable to have one or more ester polyol curing compounds to produce polyurethanes.

The part B may also include as additives one or more catalysts, pigments, and non-reactive fillers. For example, coloring pigments may be added to provide a desirable color to the coating. Small particles of bulk fillers, such as silica, may be added to reduce the chemicals content of the coating and therefore its expense, although this compromises to some extend the physical properties of the coating.

In other instances, it may be desirable to incorporate as a non-reactive filler a plasticizing agent which is non-reactive in the curing agent, such as gamma butyro lactone.

The invention includes the polyurethane and poly(urea)urethane coatings which are produced from the compositions of the invention.

The invention further includes a process for applying polyurethane and poly(urea)urethane coatings by intimately mixing the part A and part B at a temperature in the range from about 160° F to about 200° F. and a pressure of about 2,400 psig, and spraying the mixture from an atomizing nozzle in a fine spray onto a surface to be coated.

OBJECTS OF THIS INVENTION

It is therefore an object of this invention to provide sprayable, solventless polyurethane and poly(urea)urethane systems, which will produce coatings having superior physical and chemical qualities to those previously available.

Another object of this invention is to provide a part B of a polyurethane or poly(urea)urethane system which consists essentially of reactive constituents to form a substantially completely chemically reacted coating and thereby renders the coating more resistant to chemical degradation than previously available coatings.

Still another object of this invention is to provide a part B of a polyurethane or poly(urea)urethane system which is relatively economical to produce and apply and is capable of being sprayed in the field within reasonably close tolerances to provide a uniform coating of polyurethane or poly(urea)urethane having superior physical and chemical properties.

Yet another object of this invention is to provide a part B composition for a polyurethane or poly(urea)urethane system, which includes a reactive filler to allow the proper ratio of part A to part B to be maintained in a fixed proportion system for mixing part A and part B, where there is some chemical reaction between the reactive filler and the prepolymer or quasi-prepolymer so that the filler is bonded to the coating material and prevents innercoat delamination.

Yet another object of this invention is to provide a process for spraying uniform, high physical and chemical property polyurethane and poly(urea)urethane coatings using a solventless system.

A concomitant object of this invention is to provide an improved sprayed polyurethane or poly(urea)urethane coating which is produced from a polyurethane prepolymer or quasi-prepolymer and a curing agent which comprises a relatively small quantity of one or more relatively highly reactive polyols or polyamines or combinations thereof and a major proportion of a polyol having an equivalent weight in the range from about 300 to about 2,000.

DETAILED DESCRIPTION OF THE INVENTION

The invention relates to solventless compositions usable for spraying coatings of polyurethane and poly(urea)urethane. In the invention, the part A is an isocyanateterminated prepolymer or quasi-prepolymer or combination of the two. Particularly desirable prepolymers are reaction products of polyester, polyether or synthetic rubber polyols and aromatic isocyanates, such as toluene diisocyanate (TDI), xylylene diisocyanate, 3,3' bitolylene diisocyanate, and diphenylmethane-4,4' diisocyanate (MDI). Prepolymers produced from aliphatic isocyanates, such as hexamethylene diisocyanate, are also within the purview of the invention. Uniroyal "B 601" is a particularly desirable TDI-based prepolymer usable with this invention.

Quasi-prepolymers are produced from isocyanates as noted above, to which there has been added raw isocyanate, which may be the same as or different from the isocyanate used in the formation of the prepolymer.

The part A may include limited quantities (so as not to interfere with its ability to be sprayed) of a blacking agent, such as carbon black, for ultraviolet stability, fillers, such as silica, to reduce the quantity of organic components of the end product and thereby reduce its material cost, and hydrated alumina, which is a solid fire retardant.

The part A is selected to be pumpable at room temperature and to have a viscosity of under about 6 poise at 200° F., in order practically to be sprayable under the normal operating conditions of the process of the invention.

The part B or curing agent, which is used to react with the prepolymer or quasi-prepolymer, principally comprises two constituents. The first constituent comprises the reactive primary materials or curing compounds, which are selected to react almost completely with the prepolymers and/or quasi-prepolymers of the part A, to form the desired polyurethane or poly(urea)urethane.

If a polyurethane is desired, the part B will include one or more relatively reactive polyols. A polyester polyol is usually desired in connection with a polyester-derived prepolymer, and a polyether polyol in connection with a polyether-derived prepolymer.

The polyol curing compound which is selected is chosen for two properties. One is its ability to be sprayed in the reactive "filler" described below. The other is its reactivity in order to be able to form the polyurethane having the desired physical and chemical properties at a reasonable speed and achieve a gel time of between two and five minutes.

"Gel time" is a term which is well known in the art, and is the time which is required after a mixture of part A and part B is combined, before the polyurethane or poly(urea)urethane substantially sets and loses its tacky characteristic. The tacky characteristic is lost when the reaction between the curing compound and the prepolymer or quasi-prepolymer has progressed to substantial completion, so that relatively few reactive sites on the prepolymer or quasi-prepolymer remain unreacted. The selection of an appropriate gel time is important, because the reaction must be sufficiently slow to allow the part A and part B to be combined and applied uniformly to a surface in a spray form, and yet occur sufficiently rapidly that the coating being applied will "set up" very quickly so that it will not run (down the surface being coated) to create a non-uniform coat. If too short a gel time is selected, a uniform coating will not form, and if too long a gel time is selected, the coating will drip and will also not be acceptable. A gel time of about two to five minutes is also important so that the coating, which is typically applied in multiple passes of a spray gun, can be applied in thin layers, and each subsequently applied layer contacts a substrate which has sufficient unreacted reactive sites to allow a chemical reaction to occur between the outer surface of the substrate and the adjacent surface of the next layer. This forms a chemical bond between the coating layer and substrate and produces a coating which will not delaminate.

Particularly desirable polyols, used as the curing compound in the system of this invention, are 1,4 butane diol, 1,3 butane diol, resorcinol di(beta-hydroxyethyl) ether, and other polyols in the phenolic ether category. 1,6 hexane diol, glycerol and anthraquinones, such as hydraquinone di (beta hydroxyethyl) ether, sold by Eastman Kodak under the trademark HQEE, are among the most desirable polyols.

Polyols used in forming polyurethanes are well known in the art. The particular polyol to be reacted is selected after a determination has been made of the tensile strength, tear strength, modulus of elongation, rebound, compression set, low temperature flexibility and hydrolytic or chemical stability of the end product coating have been selected in view of the intended use of the coating. The polyol of choice is then matched with the prepolymer of choice to produce the desired properties.

Some of the polyols utilized may be solid or extremely viscous at room temperature, but they will be dispersed and in sprayable, liquid form at the temperatures of 160° F. to about 200° F. at which they are used in the process of this invention, dispersed in the relatively high equivalent weight polyols which act as reactive "fillers" and as dispersing agents for the curing compounds in accordance with this invention.

The particular prepolymer selected is matched with the particular curing compound or curing compounds desired in order to achieve a coating material having the desired physical characteristics and chemical resistance characteristics for the particular application. For example, if hydrolytic stability is important, a prepolymer made from diphenylmethane 4,4' diisocyanate reacted with a polyether polyol would be selected and the curing compound would desirably be a phenolic ether polyol.

The curing compounds are present in an amount from about 10% to about 80% by weight of the part B, depending on the particular prepolymer being reacted, the ratio of part A to part B being mixed and the desired properties of the end product.

It may also be desired to form a poly(urea)urethane, in which case the curing compound or compounds would be polyamines, preferably diamines. In that instance, the polyamine selected would be present in a quantity to react substantially completely with the available isocyanates in the given prepolymer. A particularly desirable diamine is 4,4' methylenedianiline (MDA). MDA is crystalline at room temperature and the polyol filler will disperse the MDA at room temperature and at temperatures in the range from about 160° F. to about 200° F., in order to allow it to be sprayed.

A preferred diamine which is liquid at room temperature and which is therefore more readily mixable and sprayable in a polyol "filler" of this invention is menthane diamine, which is 1,8-diamino-p-menthane.

Another preferred diamine, which is liquid at room temperature and is therefore more readily miscible and sprayable in a polyol "filler" of this invention, is methylene bis (2,6-diisopropylaniline). Liquid diamines are also preferred, due to their stability at temperatures below 20° C. Crystalline diamines tend to precipitate out of solution at lower temperatures. Diethylated toluene diamine and monoethylated toluene diamine are also preferred diamines.

For specific properties, compounds containing primary hydroxyl groups and secondary or tertiary amines, which are useful for catalysis, may be chosen.

Hybrid compounds containing primary hydroxyls and diamines may also be desirable. One example is polyglycolamine H-163, which is sold by Union Carbide.

The particular quantity of polyamine utilized is an equivalent weight which will almost completely react with the available NCO's in the urethane prepolymer or quasi-prepolymer and provide the needed bulk. Incomplete reaction of the curing compounds with the prepolymer is desired, because the "filler" will contain reactive hydroxyl groups in order to react with the remaining available NCO groups in the prepolymer or quasiprepolymer, so that the "filler" is an integral, chemically bonded part of the polyurethane or poly(urea)urethane coating. If a non-reactive (in the polyurethane-forming reaction) filler is used, it will not bind chemically with the polyurethane or poly(urea)urethane, and will be more susceptible to hydrolysis and could also be leached out by fluids flowing past the coating surface. A non-reactive filler is also more susceptible to degradation by chemical reaction with contaminant passing the coating.

When working with less reactive diisocyanates, such as hexamethylene diisocyanates, more highly reactive diamines may be used. Preferred highly reactive, aliphatic diamines are menthane diamine and 1,4-diamino cyclohexane.

When spraying polyurethane or poly(urea)urethane, the available spraying equipment will only proportion the two components in predetermined ratios. The conventional ratios are 1:1, 2:1, 3:1, and 4:1. For optimum mixing, a 1:1 ratio is most desirable and 4:1 ratio is least desirable. However, in order to completely react 100 parts of prepolymer or quasiprepolymer to produce polyurethanes as surface coatings, only about five to twenty parts of relatively highly reactive curing compounds would be required, depending upon the amount of available isocyanate in the prepolymer and the equivalent weight of the curing agent. Therefore, in order to provide a mixable quantity of part B within the confines of the given pumping systems, it is necessary to "fill" or dilute the part B with another material. That diluent is a polyol having an equivalent weight in the range from about 300 to about 2,000. The diluent serves the function of "bulking" the curing compounds. Because the diluent is a polyol and reactive with the prepolymer or quasi-prepolymer, it forms a chemical bond wih the ultimate polyurethane or poly(urea)urethane, increasing the hydrolytic stability and other chemical resistance properties of the final polyurethane or poly(urea)urethane coating and allows a cohesive coating to be formed in multiple passes of a spray gun without inner coat delamination problems.

The "filler" serves as a bulking agent, to increase the volume of the part B of the system, in order to maintain a desired ratio of part A to part B in the spraying equipment. The "filler" is a polyol, having an equivalent weight in the range from about 300 to about 2,000, and is relatively nonviscous and easily sprayed at temperatures in the range from about 160° F. to about 200° F., the temperatures at which the coating compositions of this invention are commercially applied.

A particularly desirable group of polyols to be used as fillers are sold by Quaker Oats Chemical Division under the trademark "Polymeg", polytetramethylene ether glycol, and as sold have molecular weights of 650, 1,000 and 2,000. The Polymeg 650 would be used when only relatively small amounts of filler are needed, as when a high mixing ratio of part A to part B, such as 4:1 is used. Polymeg 1,000 and Polymeg 2,000 would be utilized, depending upon the increased amount of filler required to maintain the requisite of proportion between the part A and part B, when low ratios, such as 1:1 or 2:1 are used.

Another very desirable filler is a hydroxyl terminated polybutadiene, which is particularly desirable if the prepolymer of the system has a polybutadiene backbone, and will therefore have enhanced hydrolytic stability in comparison with ether and ester based prepolymers. One such polybutadiene filler is sold by Arco Chemical under the trademark "Poly BD."

Although the curing compound or compounds and reactive filler comprise the primary components of part B of the system, other materials could be incorporated in the part B, in order to affect the polyurethane-forming reaction or contribute particular properties to the end product.

Catalysts such as dibutyl tin dilaurate and stannous octoate are used in connection with the formation of polyurethane coatings. If poly(urea)urethanes are to be utilized, catalysts such as tetramethylethylene diamine would be utilized. The particular catalysts selected are well known in the art, and either are utilized in liquid form or, if they are normally solid, are dispersed in a plasticizer, which is then also introduced into the part B. In addition, small amounts of cross-linking agents, which usually are triols or quadrols, may be added to increase cross-linking for increased load-bearing capability and reduced permanent compression set of the coating. Trimethylol propane is one such cross-linking agent.

Solid, unreactive fillers, such as silica, having a particle size of 10 microns or less, may be used if it is desired to reduce the amount of expensive organic constituents in the end product. For example, if roofing coatings are produced in accordance with this invention, and it is important to reduce the cost of the coating, silica may be used to replace in part the chemical constituents of the polyurethane or poly(urea)urethane. The silica particles utilized would be extremely small, on the order of ten microns or less so that they could easily be dispersed and sprayed in the system and would comprise no more than one-half of the weight of the coating.

In special instances it may be necessary to include in the part B or part A a liquid filler which does not react with the prepolymer or quasi-prepolymer, in addition to the reactive filler. Although it is preferred not to have any unreactive filler in the system of this invention, it may sometimes be necessary. Thus, for example if MDA is used in the system, gamma butyro lactane or dimethyl phthalate is included in the system as a dispersing agent for the otherwise crystalline MDA. The unreactive filler may comprise up to 80% by weight of the part B and preferably not more than 30%. It is important to note that the unreactive filler is only included in the system of this invention if it is necessary, as to disperse the MDA. It is preferred to use a system that does not necessitate a non-reactive filler, in order to assure the optimum bond between the filler and polyurethane coating.

Hydrated alumina, as a fire retardant, blacking agents such as carbon black to prevent or reduce ultraviolet degradation and pigments for coloration could also be added in limited quantities to the part B. If a solid pigment is selected, it is desirable to obtain a pigment which is sold dispersed in a polyol, and the reactivity of the polyol can be taken into account to reduce the amount of reactive filler otherwise present in the part B.

The compositions of this invention are field applied in the following manner. The part A is typically stored in a 55-gallon drum and the part B is stored in another 55-gallon drum. Each drum contains a nitrogen atmosphere above the liquid level at a pressure of 2 to 4 psig, to keep out moisture and prevent cavitation in the delivery pump.

The delivery pump for the part A is a Graco 10:1 Monark delivery pump and the delivery pump for the part B is a Graco 5:1 Monark delivery pump. The part A and part B are delivered from the drums in two quarter-inch i.d. 3,000-pound paint hoses with nylon lining. The components then pass through electric induction heaters which heat the part A and the part B to a temperature in the range of 160° F. to 200° F. and preferably about 180° F.

The pre-heated materials go into proportioning cylinders which are mounted below a Graco Bulldog 30:1 air motor which operates at 100 psig air pressure and has a 3:1 lower assembly to provide a 25:1 fluid to air ratio. The part A and part B go from the proportioning cylinders to heated hoses, where they are maintained at the 180° F. temperature, to a spray gun. The part A hose has a one-half inch i.d. and part B hose a one-quarter inch i.d. The hoses are electronic resistance wound and thermostatically controlled.

The spray gun is a Binks 43-P plural component gun, in which the part A and part B are mixed. The mixture is fed into a Kinex static one-quarter inch i.d. mixer in which the components are further mixed and delivered to a Graco carbide airless spray tip, having an orifice between 0.020 inches and 0.062 inches, depending upo the quantity of material to be delivered.

The mixed system of part A and part B is sprayed in an atomizing spray with the droplets having a particle size on the order of about ten to fifty microns. The pressure at the spray tip is typically about 2,400 psig.

In field operation, the spray gun is handled manually by an operator and is moved to deposit linear, adjacent widths of the sprayed material. The amount of material deposited in a single pass is generally in the range from about twenty to sixty mils in thickness of coating after the pass has been completed. A given coating is usually applied in multiple passes, the number of passes depending upon the thickness of coating deposited in a single pass and the thickness of coating desired. Multiple passes are usually desired, so that a thin layer is applied with each pass. Thick layers tend to drip and create non-uniform coatings unless the gel time of the reaction is so small that there is a danger that the coating will "set up" before it is deposited on a substrate.

The thickness of each coating application and the width of the spray deposited can be varied, depending upon the spray tip orifice size and the angle of the tip orifice which determines the "fan width" of the spray.

When a polyurethane or poly(urea)urethane coating is deposited, it will take from about two to five minutes to gel or set as described above. A subsequent coating application should be made before the substrate coating has completely gelled or set, so that reactive sites are available on the substrate to react with the next layer being applied and provide a good interlayer adhesion, so that intercoat delamination of the layers applied in successive passes of the spray gun does not occur.

Before the coating is applied, the surface to be coated must be prepared with suitable surface preparation and may require the initial application of a primer coating. The surfaces which may be coated with the materials and process of this invention are quite varied and include steel, wood, concrete, cinder block, galvanized iron and reinforced or virgin polyester, epoxys, phenolics and rubber, to name some.

If concrete or cinder block are to be coated, for example, they are initially brush blasted with a pressurized mineral abrasive. Surface preparation techniques are well known in the art.

Primers may be required to be applied to the substratebefore the polyurethane coating, the particular primer selected depending upon the particular substrate to be coated. The primers applied in the preparation of the surface for application of the compositions of this invention are also well known in the art.

If a polyol curing compound is used and, depending upon the curing agent, if some diamine curing compound is used, the completion of cure by the subsequent application of heat may be necessary. If this is required, the coating is completely applied, and a gas-fired or other suitable heater is placed near the coating and used to heat the coating by convection and radiation.

EXAMPLE I

A poly(urea)urethane polymer was made using 100 parts of a part A which consisted of a TDI prepolymer, having a 6.02 NCO content and sold by Anderson Development Company under the trademark "95-AP". This prepolymer is formed by the reaction of TDI with a polyether polyol. Part B, present in 34.5 parts to each 100 parts by weight of part A, is made up of the following components:

1. 11.5 parts by weight of 4,4' methylene dianiline, sold by Allied Chemical Company. The MDA functions as a catalyst for the formation of the poly(urea)urethane and as a chain extender.

2. 10.0 parts by weight of a polytetramethylene ether glycol, having a molecular weight of 1,000 and sold by Quaker Oats Company under the trademark "Polymeg 1000." The Polymeg functions as a reactive "filler."

3. 1.0 parts by weight of Verona black 715, a black pigment dispersed in a glycol dispersing agent having a molecular weight of 3,000. The glycol dispersing agent is selected because it functions as a reactive "filler," in the same way as the Polymeg and the amount of Polymeg in the part B is adjusted to account for the bulk and reactivity glycol dispersing agent for the black pigment.

4. 12.0 parts by weight of anhydrous gamma butyro lactone, sold by General Analine and Film under the trademark "BLO."

The part B constituents were intimately blended and placed in a 55-gallon drum, as was the part A, which was placed in a separate 55-gallon drum and spray-applied at a mixing temperature of 180° F. with the equipment described above. The coating was applied in six successive layers, each of about 40 mills in thickness. The coating was applied on a substrate of plain carbon steel, grit blasted to a profile of 5 to 7 mils in accordance with SSPC-SP-5 white metal blast cleaning. A commercial primer sold under the trademark "Thixon 1050 A/B" was applied by spraying prior to application of the coating of this invention. The resulting coating had good innercoat adhesion properties, good hydrolytic stability and other physical and chemical properties.

EXAMPLE II

A poly(urea)urethane coating composition was formed using Vibrathane "B601," a Uniroyal TDI-polyether glycol prepolymer having an NCO of 6.4, as part A. The part B was 10.8 parts of "Tonox-LC," a polymerized methylene dianiline sold by Uniroyal. The reactive "filler" was 23.6 parts of Polymeg 1,000. No pigment was used in this system. The part A and part B were mixed in a ratio of 3:1 by volume and sprayed using the equipment described above at a temperature of about 180° F. and a pressure of about 2,400 psig. This composition was used to coat a plain carbon steel roll. The surface of the roll was prepared by a grit blasting as described in Example I and the primer as described in Example I was used. A single pass of 22 mils was applied, and the resulting coating was good.

EXAMPLE III

A polyurethane coating was made using a part A consisting of Uniroyal "B670," a polyether based MDI-terminated prepolymer, having an NCO of 11.0. The part B consisted of 30% by weight of "XA," a hydroquinone ether polyol sold by Mobay Chemical and 70% by weight of 1,4 butane diol sold by General Analine and Film under the trademark "1,4 BD" in the relative quantities of 3.27 parts of XA and 7.63 parts of 1,4 BD, and the reactive "filler" was 23.6 parts of Polymeg 1,000. No pigment was used. 0.00236 parts by weight of stannous octoate, manufactured by Witco Chemical, and sold as "Fomrez C-2" was included as a catalyst. The volume ratio of part A to part B was 3:1. The foregoing system was mixed at 180° F. and sprayed at 2,400 psig onto polyethylene sheeting. Three passes, each of 25 mils, produced an excellent coating, which had good hydrolytic stability and innercoat adhesion properties.

EXAMPLE IV

A poly(urea)urethane was produced using a part A which consisted of 100 parts of "B 601." The part B consisted of 7.98 parts by weight of menthane diamine as the reactive curing compound and the reactive "filler" was 26.5 parts by weight of Polymeg 1,000. The part A and part B were combined in a ratio of 3:1 by volume at 180° F. and 2,400 psig using the equipment described above and sprayed on a polyethylene sheet with no surface preparation, using four passes of 25 mils each. The resulting poly(urea)urethane coating had good physical and chemical characteristics and inner surface adhesion.

It is to be understood that the choice of the particular prepolymer or quasi-prepolymer and the particular curing agent compounds are determined by the physical and chemical properties desired to be achieved in the ultimate sheet. Once a given prepolymer or quasi-prepolymer and curing compound have been selected, the amount of reactive "filler" is determined in order to maintain a predetermined volumetric ratio of part A to part B.

EXAMPLE V

A poly(urea)urethane coating was made using a part A consisting of a reaction product of hexamethylene diisocyanate with 1,000 molecular weight polytetramethylene ether glycol, sold by DuPont under the trademark LW-550, with a 5.55 available NCO content, blended in a ratio of 9 to 1 by weight with Benzoflex 9-88, which is dipropylene glycol dibenzoate, sold by Velsicol, as a viscosity modifier to allow the prepolymer to be sprayed. The part B was a blend of 10.26 parts by weight of menthane diamane and 23.74 parts by weight of the Benzoflex 9-88 as a non-reactive filler. No other additives were used. The volume ratio of part A to part B was 3:1. The foregoing system was mixed at 180° F. using equipment as described above, and sprayed at 2600 psig onto a Teflon substrate. Three passes, each at 30 mils, produced a coating which had the following excellent properties, light stability, 400% elongation and 2,000 psi tensile strength, when air cured at room temperature for 24 hours.

EXAMPLE VI

A poly(urea)urethane was produced in the same manner as set forth in Example V, but using DuPont's LW-570, an aliphatic isocyanate prepolymer with an available NCO content of 7.56. This was mixed with a part B comprising 14 parts by weight of 1,4-diamino cyclohexane and 20 parts by weight of Benzoflex 9-88 SG as a non-reactive filler. In all other respects this example was applied in a manner described in Example V and produced similar physical properties, but a greater hardness.

EXAMPLE VII

A poly(urea)urethane polymer was made in the identical manner as set forth in Example I, with the sole exception that the 12.0 parts by weight of BLO were replaced by dimethyl phthalate. The resulting coating had 400% elongation and 3,000 psi tensile strength.

EXAMPLE VIII

A poly(urea)urethane was formed using a part A which comprised a prepolymer of toluene diisocyanate and Polymeg 1,000 (which is equivalent to Uniroyal's B 601) in the proportion by weight of 3:1, having an available NCO of 6.370. The part B comprised 12.4 parts by weight of methylene bis(2,6-diisopropylaniline) as the highly reactive curing agent, 21.6 parts by weight of Polymeg 1,000 as the filler, and 1% by weight of organo-titanate as a catalyst. The part A and part B was sprayed at a 3:1 ratio using the equipment described above at a temperature of 180° F. and a pressure of 2400 psig. The material was sprayed onto a polyethelene sheet, had excellent gloss, due to a gel time of about 4 minutes, and excellent physical properties. Gloss is a desirable characteristic for aesthetic reasons. The tensile strength of the coating exceeded 3,500 psi.

EXAMPLE IX

A poly(urea)urethane coating composition was formed using a prepolymer which consisted of toluene diisocyanate and Polymeg 2,000, with an available NCO content of 5.7, having a 2 to 1 NCO to OH molar ratio. The part B consisted of a curing agent which was a blend of 96% by weight of diethylated toluene diamine and 4% by weight monoethylated toluene diamine in a total amount of 6.6 parts by weight and 27.4 parts by weight of Polymeg 1,000 as the reactive "filler". The part A and part B were mixed in 3:1 proportions by volume and sprayed at 180° F. and 2400 lbs. pressure psig on a substrate of Teflon, producing excellent tear strength and rebound properties.

EXAMPLE X

A coating composition was sprayed, using the part A described in Example VI and a part B consisting of 6.2 parts by weight of 1.4-diamino cyclohexane, 26.2 parts by weight of Polymeg 1,000 and 1.0 part by weight of acetyl acetonate, a catalyst. The conditions of application were as specified in Example V. The resulting material had excellent qualities of resilience and softness.

It will be apparent that numerous variations can be made in the practice of the invention, by selecting particular prepolymers, quasi-prepolymers and combinations thereof, particular curing compounds which are polyols or polyamines or combinations thereof, catalysts and particular reactive and other fillers, to establish the specific physical and chemical characteristics and economics of use of the surface to be coated.

The invention also includes the novel and useful polyurethane coatings and poly(urea)urethane coatings produced by the use of the part B compositions of this invention.

What is claimed:

1. A method for the solventless spray application of a polyurethane or poly(urea)urethane coating, comprising the steps of:
    (a) Delivering to a mixing chamber an isocyanate-terminated polyurethane prepolymer or quasi-prepolymer;
    (b) Delivering to said mixing chamber a curing agent comprising from about 10% to about 80% by weight of one or more relatively highly reactive polyols and/or polyamines in an amount sufficient almost completely to cure the prepolymer or quasi-prepolymer and from about 90% to about 20% by weight of a reactive polyol filler having an equivalent weight in the range from about 300 to about 2,000;
    (c) If necessary to effect fluid transfer and intimate admixing, heating said polymer and/or quasi-prepolymer and/or said curing agent to a temperature in the range from about 160° F. to about 200° F.;
    (d) Intimately admixing said prepolymer or quasi-prepolymer and said curing agent; and
    (e) Immediately after admixing, spraying said admixture through an atomizing nozzle onto a surface to produce a polyurethane or poly(urea)urethane coating.

2. A method as set forth in claim 1, in which the filler is a polytetramethylene ether glycol having an equivalent weight in the range from about 300 to about 1,000.

3. A method as set forth in claim 1, wherein said filler includes one or more pigments dispersed in a polyol having an equivalent weight in the range from about 300 to about 1,000.

4. A method as set forth in claim 1, wherein said prepolymer and said curing agent include up to about 50% by weight of silica particles having a particle size of not more than ten microns.

5. A method as set forth in claim 1, wherein said isocyanate-terminated prepolymer is formed from the reaction of toluene diisocyanate and a polyether glycol and the highly reactive polyol and/or polyamine comprises menthane diamine.

6. A method as set forth in claim 1, wherein said prepolymer is formed by the reaction of toluene diisocyanate and a polyether glycol and said curing agent comprises crystalline methylene dianaline, gamma butyro lactone and a polyether glycol having an equivalent weight in the range from about 300 to about 1,000.

7. A method as set forth in claim 1, wherein said isocyanate-terminated prepolymer is formed from the reaction of hydroxyl terminated polybutadiene and diphenylmethane-4,4' diisocyanate and said relatively highly reactive compound is polybutadiene.

8. A method as set forth in claim 1, wherein said relatively highly reactive compound is methylene dianiline, which comprises about 33.3% by weight of the curing agent and a polyether glycol having an equivalent weight of about 500.

9. A method as set forth in claim 6, wherein said curing agent includes a pigment dispersed in a polyether glycol having an equivalent weight in the range from about 300 to about 1,000.

10. A method as set forth in claim 1, wherein the gel time of the reaction between the curing agent and the prepolymer or quasi-prepolymer is from about two to about five minutes.

11. A method as set forth in claim 1, wherein the prepolymer is a polyether based prepolymer of diphenylmethane 4,4'-diisocyanate, said curing compound is 1,4-butane diol and said filler is a polytetramethylene ether glycol having a molecular weight of about 1,000, the volume ratio of prepolymer to curing agent being about 3:1.

12. A method as set forth in claim 1, wherein said highly reactive polyols and/or polyamines comprise from about 10% to about 60% by weight of the curing agent.

13. A method as set forth in claim 1, wherein said curing agent includes dimethyl phthalate as a non-reactive filler.

14. A method as set forth in claim 1, wherein the curing agent comprises methylene bis(2,6-diisopropylaniline).

15. A method as set forth in claim 1, wherein the prepolymer is a reaction product of hexamethylene diisocyanate with a polytetramethylene ether glycol having a molecular weight of about 1,000.

16. A method as set forth in claim 1, wherein the curing agent comprises diethylated toluene diamine.

17. A method as set forth in claim 1, wherein the volume ratio of the compositions set forth in step (a) to the compositions set forth in step (b) is in the range from about 1:1 to about 4:1 and is a whole integer.

18. A method as set forth in claim 1, wherein said polyol has an equivalent weight in the range from about 500 to about 1,000.

19. A method as set forth in claim 14, wherein said reactive polyol filler has an equivalent weight of about 1,000.

20. The product of any of the methods set forth in claims 1-19 inclusive.

* * * * *